July 6, 1954 H. A. S. HOWARTH 2,682,934
MECHANICAL BRAKE FOR REVERSIBLE TORQUE
Filed Feb. 13, 1952 4 Sheets-Sheet 1

Inventor
Harry A. S. Howarth

By G. J. Kessenich, A. W. Dew & S. J. Rotondi, Jr.
Attorneys

July 6, 1954  H. A. S. HOWARTH  2,682,934
MECHANICAL BRAKE FOR REVERSIBLE TORQUE
Filed Feb. 13, 1952  4 Sheets-Sheet 2
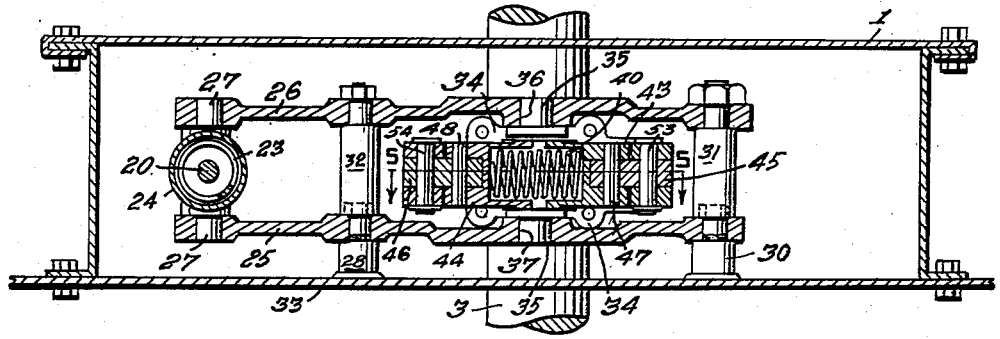
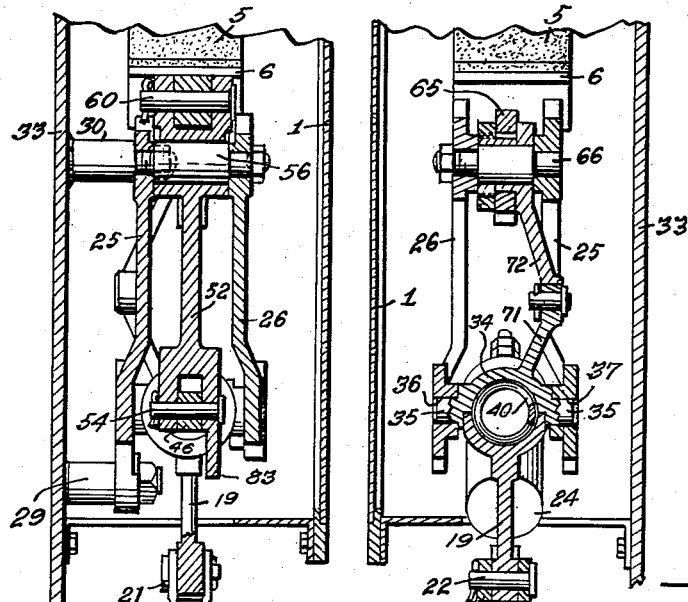
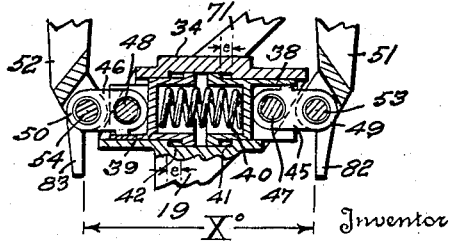
Inventor
Harry A. S. Howarth

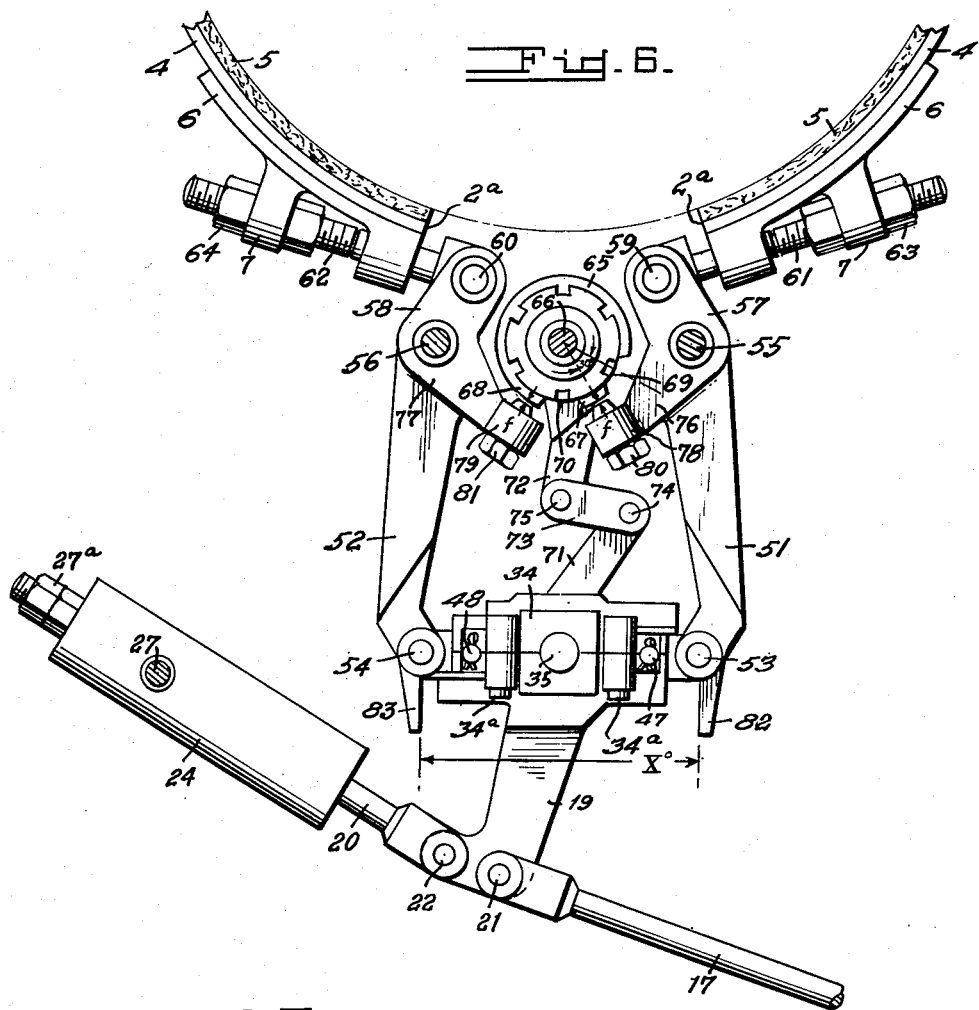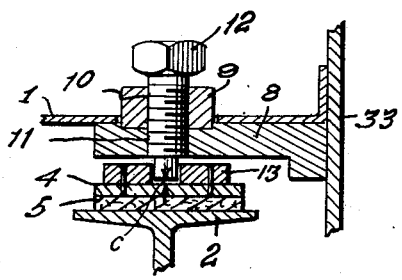

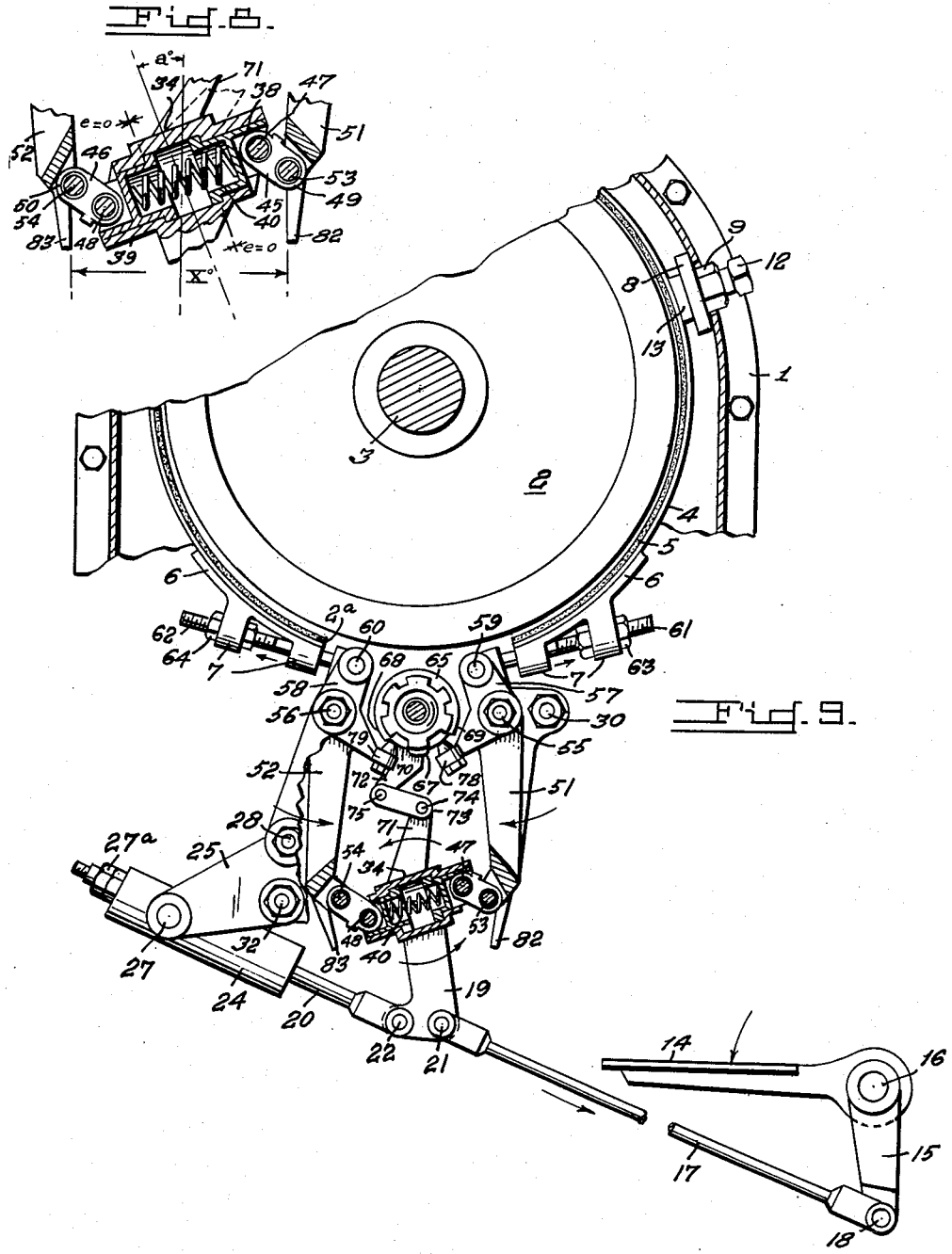

Patented July 6, 1954

2,682,934

UNITED STATES PATENT OFFICE 2,682,934

MECHANICAL BRAKE FOR REVERSIBLE TORQUE

Harry A. S. Howarth, Philadelphia, Pa., assignor to the United States of America as represented by the Secretary of the Army Application February 13, 1952, Serial No. 271,308

11 Claims. (Cl. 188—77)

The present invention relates to a double acting mechanical brake for reversible torque constructed and arranged to hold equally well whether the brake drum turns clockwise or counterclockwise.

In some heavy ordnance equipment an equilibrator is provided, which may be of the hydropneumatic type, to neutralize the unbalanced weight of the gun barrel in order to reduce the manual effort needed to elevate and depress the piece. Handwheels are also provided to be grasped by the operator when the piece is to be elevated, the force applied to the handwheel being in turn transmitted through suitable gearing to raise or lower the barrel. In firing, these gears are locked against rotation by a brake which is held continuously in set position by spring action until the need for changing the elevation of the piece arises, whereupon the brake is released by downward pressure exerted on a hand lever or foot pedal.

It is therefore an object of this invention to provide a novel mechanical brake to lock the gun barrel in set position when the gun is being fired.

A further object of this invention is to provide a mechanical brake of the external expanding and contracting type wherein the brake bands are disposed about the periphery of the brake drum.

Yet another object of this invention is to provide an external expanding and contracting mechanical brake which is double acting, i. e. it will hold equally well whether the brake drum tends to turn clockwise or counterclockwise.

Still another object of this invention is to provide novel brake spring cylinder means acting through levers to apply an equal force to each end of the brake bands.

A still further object is to provide a mechanical brake having means which are adjustable to cooperate with the beforementioned brake cylinder spring to achieve any desired brake band tension.

Other objects and advantages will become apparent during the course of the following description.

In the accompanying drawing, forming a part of the specification, and in which like numerals are employed to designate like parts throughout the same:

Figure 2 is a section taken on line 2—2 of Figure 1.

Figure 3 is a section taken on line 3—3 of Figure 1.

Figure 4 is a section taken on line 4—4 of Figure 1.

Figure 5 is a section taken on line 5—5 of Figure 2.

Figure 6 is a detail of the moving parts of the brake mechanism and showing the brake bands in contracted position.

Figure 7 is a section taken on line 7—7 of Figure 1.

Figure 8 is a section similar to Figure 5 showing rotation of the spring housing through an angle $a_0$ so that clearance $e$ is zero.

Figure 9 is a view in elevation, with the spring housing in section and rotated through an angle greater than $a_0$ to expand the brake drum so that the drum can be rotated.

Figure 1:
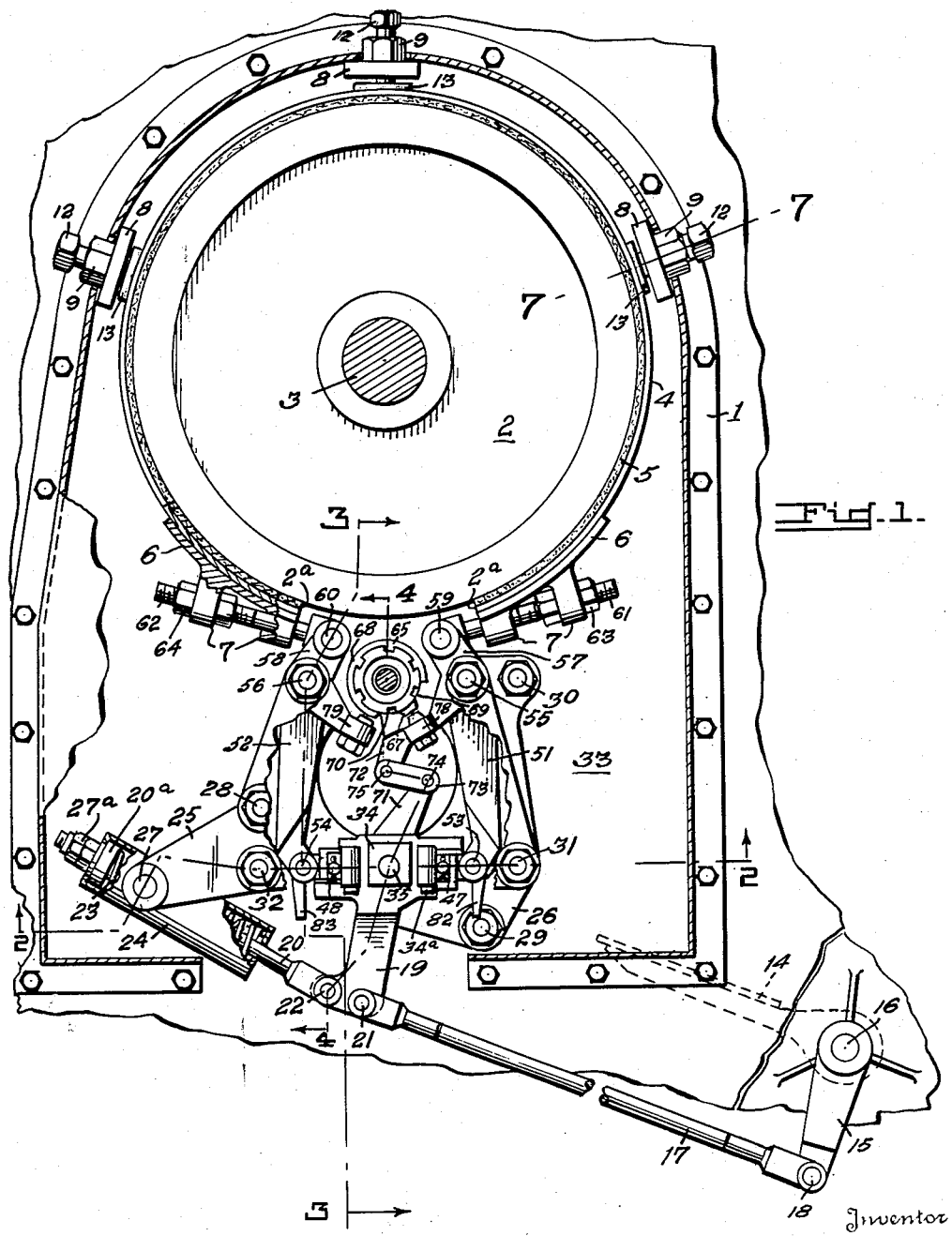
Figure 1 is a view in elevation, with some parts broken away, of the brake housing, brake drum and bands, and brake actuating mechanism.

Referring to the drawings, the brake mechanism comprises a housing 1 constructed to receive a drum 2 which is mounted to rotate with shaft 3. Brake band 4 is distributed substantially about the entire periphery of drum 2 leaving circumferentially spaced ends 2a to be anchored to the actuating mechanism. Brake lining 5 is interposed between the brake band and brake drum, in the well known manner. Plates 6 having bosses 7 are welded to or made integral with the brake band ends for a purpose to be subsequently described. Three guide bolts are provided about the upper portion of the brake band to limit the expansion of the brake shoe when brake band tension is relieved. These guide bolts, seen sectioned in Figure 7, comprise a bracket 8 welded to a plate 33 of the brake housing, and a lock nut 9 secured to the top surface of bracket 8, the bracket and nut having internally threaded bores 11 and 10 in axial alignment to receive a screw 12. Screw 12 projects beyond the lower surface of bracket 8, and is received in a recess provided by strips 13 secured to the brake band in any convenient manner. A clearance $c$ is provided between the guide bolt points and the tightened brake band to permit the brake lining to be clear of the brake drum when the brake band tension is released and the band is expanded.

The actuating mechanism for releasing the brake comprises a foot pedal 14 which is secured to a bell crank member 15 mounted for rotation about a stud 16 fixed to the gun carriage. One end of a long rod 17 is in turn pivotally connected to bell crank 15 by means of a pin 18, the other end being pivotally connected to the lower end of lever 19. Lever 19 is connected to rod 17 and to a short rod 20 by means of pins 21 and 22, thus it is apparent that when pressure is applied to foot pedal 14, rod 17 will move to the right as seen in Figures 1, 6 and 9 to cause lever 19 to effect counterclockwise rotation. The action of the pedal is resisted by a helical compression return-spring 23 mounted in a trunnion assembly comprising a sleeve or cylinder 24 having a bore at its lower end to permit the reciprocation of the upper end of rod 20 in response to foot pedal pressure and spring action. Rod 20 extends through cylinder 24 and through a plug or piston 20a which closes the upper end of the cylinder and is slidable within it in response to action of the foot pedal. Compression spring 23 surrounds rod 20 and abuts against the lower face of piston 20a on one end and the bottom of cylinder 24 on the other end. The uppermost end of rod 20 is threaded to accommodate nut assembly 27a which is provided to adjust the initial position of the parts in the trunnion assembly. Cylinder 24 of this assembly is trunnioned between mounting plates 25 and 26 (Fig. 2) for pivotal movement about aligned trunnions 27. Plates 25 and 26 serve also to mount the remaining elements of the actuating mechanism in a manner to be later described, studs 55, 56, 31 of Figure 1 and 66 of Figure 4 securing the plates together in spaced relation whereas studs 28, 29 and 30 serve to anchor the mounting plates to the back plate 33 of the brake housing.

The upper end of lever 19 forms with the lower end of lever 71 a band tension spring housing 34 which has aligned trunnions 35 journaled in bearings 36 and 37 formed in the respective plates 25 and 26, as shown in Figure 2. The housing comprises upper and lower complementary halves, conjointly forming a cylinder, as in Figure 5, open at both ends and containing oppositely disposed cup-shaped thimbles or pistons 38 and 39 that are pressed outwardly by a spring 40 compressed between them. The upper and lower halves of the cylinder are fastened together by bolted lugs, as indicated in Figures 1 and 2, using bolts such as 34a, passing through aligned holes in each mating pair of lugs. Stops 41 and 42 are provided on the inner wall of housing 34 to limit the outward movement of the pistons within the cylinder formed by the housing. The outer ends of pistons 38 and 39 are shaped in the form of a U, designated as 43 and 44 (Fig. 2), one end of links 45 and 46 being received within the legs of the U and pivotally connected thereto by means of pins 47 and 48. The other ends of links 45 and 46 are received within bifurcated ends 49 and 50 of the long portion of levers 51 and 52, pin connections 53 and 54 being provided to permit pivotal movement of the links relative to levers 51 and 52.

Levers 51 and 52 are in turn mounted, as in Figure 6, for pivotal movement about pins 55 and 56 which are secured to the mounting plates as in Figure 3. Short arms 57 and 58 of the levers 51 and 52 are connected by means of pins 59 and 60 to adjustable bolts 61 and 62 which are secured to and control the position of plates 6 fastened to the ends of the brake band 4. The adjustable bolts are provided with nuts 63 and 64 which are used to adjust the brake band tension as later to be described and to correct for wear in the brake lining.

A stop cam 65 disposed below the brake drum and between the short arms of levers 51 and 52, is mounted for rotation about stud 66, secured between the mounting plates 25 and 26. The stop cam has two high portions 67 and 68 forming recesses 69 and 70 between them. The stop cam is rotatable by means of a linking mechanism comprising a first link 71 secured to housing 34, a second link 72 secured to the stop cam and a third link 73 connected by pins 74 and 75 to links 71 and 72 respectively. Levers 51 and 52 are provided with another set of short arms 76 and 77 downwardly angularly disposed relative to the long arms and having bosses 78 and 79 formed in their ends and tapped to receive follower bolts 80 and 81 whose hardened points are adjustable to face toward the raised portions of the stop cam when the brake band is tightly locked. In normal position, a clearance or gap $f$ is provided between each of the follower bolt points and the stop cam.

The position of the elements as disclosed in Figures 1, 5 and 6 shows the brake in locked position so that the drum and shaft are locked against rotation. The pressure of spring 40 is transmitted through the pistons and through the links 45 and 46 to levers 51 and 52 forcing these levers outwardly and causing the first mentioned set of short arms 57 and 58 to be forced inwardly to apply tension equally to each of the brake band ends. This tension is equal to the spring force multiplied by the ratio of the long arms to the short arms of the levers. As clearly seen in Figure 5, when the brake drum is locked against rotation the centers of pins 53 and 54 are $X_0$ distance apart and thimbles 38 and 39 are each removed from the respective stops 41 and 42 by a distance represented as $e$. In order to release brake band tension to permit the drum to rotate, pins 53 and 54 must be brought closer together than distance $X_0$. This cannot be done unless the cam 65 can be rotated to a position where the cam low point 69 is under the end of stop bolt 80 and cam low point 70 is under the end of stop bolt 81. Angular rotation of the cam of about 30° from the position seen in Figure 6 will effect this result. This is accomplished by counterclockwise rotation of spring housing 34 and its arm 71 which causes link 73 to move cam arm 72. The operation is as follows. When foot treadle 14 (see Figs. 8 and 9) is depressed part way rod 17 will cause arm 19 to pivot about pin 35 through an angle $a_0$ so that the thimble flanges just touch stops 41 and 42. In this position the distance $e$ is zero. However the distance between pins 53 and 54 has not changed and is still $X_0$. As seen in Figure 9, continued pressure on foot treadle 14 will increase the counterclockwise rotation of spring housing 34 so that $a_0$ is exceeded resulting in a decrease in the distance between pins 53 and 54 to a value less than $X_0$ to cause brake band tension to disappear. Since counterclockwise rotation of the spring housing 34 has also rotated the cam 65, follower bolts 80 and 81 are free to move into recesses or gaps 69 and 70 and band pins 59 and 60 are free to move farther apart causing the brake band to leave the surface of the drum. The band will expand until its outer surface rests against the ends of screws 12 reducing clearance $c$ to zero (see Figs. 1, 7 and 9). When pressure on the foot pedal is released, compression spring 23 returns the band tension spring housing and cam to their normal positions, thereby again locking the brake band on the brake drum, by means of friction torque.

In the locked position of the brake the stop cam and follower bolts are also effective to resist torsional vibration caused by torque reversal, the brake holding equally well whether the brake drum tends to turn clockwise or counterclockwise. In order for this to occur one end of the band, depending on whether the tendency of drum rotation is clockwise or counterclockwise, must be firmly held against a tension $T_2$ produced in it by the integrated frictional drag $F$ of the lining upon the periphery of the drum, the radius of which may be designated as $R$. To establish such a friction drag, which will yield a brake torque equal to $F \times R$, the disclosed double acting brake has been designed so that the braking torque $F \times R$ will result from a drag $F$ that will oppose drum rotation regardless of whether rotation is clockwise or counterclockwise. When the drum is at rest, spring 40 and the relative position of parts as best seen in Figures 1, 5 and 6 will produce a tension $T$, in both ends of the brake band. As can readily be seen, a distance $f$ separates the surfaces of the follower bolts 80, 81 and the raised faces of the cam at 67 and 68. If for example, the drum tries to turn clockwise, the gap $f$ between bolt 81 and its corresponding raised face will disappear. At the same time the gap $f$ between face 67 and bolt 80 will increase to approximately twice $f$, thus causing the lever assembly pins 54 and 53, to shift toward the right, as seen in Figure 6, a distance of approximately $3f$, without changing $X_0$. The length of spring 40 remains unchanged, a change merely being reflected in clearances $e$ in the spring housing 34 (see Figure 5). Since bolt 81 is now against the cam the tension on pin 60 will increase to a value $T_2$ greater than $T$, to produce a braking torque $F \times R$, the pull on pin 59 remaining at the value $T$. This braking force will "freeze" the drum and prevent its rotation. When the drum starts to turn counterclockwise, the lever 57 on the right side will pivot clockwise about its pivotal support 55 until the point of stop bolt 80 reaches the cam thus closing gap $f$. Meanwhile the force of spring 40 causes pin 60 to maintain the band tension and its follower bolt point draws away from the raised portion of the cam stop a distance $2f$ at 68. The clearances $f$, between the follower bolt points and stop cam are very small and therefore these actions take place quickly, and the tension in the brake band at once produces torque sufficient to prevent slippage of the drum. Brake band tension may be so set, if desired, to provide slight drum slippage in either direction to thereby dampen vibration by using a "softer" spring 40 in the band tension spring housing 34.

Means are also provided to adjust the band tension to any desired amount within the limits of the known characteristics of the spring 40 in the tension spring housing. These means comprise fingers 82 and 83 extending downwardly from levers 51 and 52, and which may be set at a certain predetermined distance $X_0$ apart to give the desired band tension. The required distance is dependent upon the band tension spring characteristics and the band tension desired. The predetermined distance is easily achieved by manipulating the eye bolts 61 and 62. Band tension adjustment is effected as follows. Follower bolts 80 and 81 are first loosened to provide ample clearance between the bolt ends and the raised portions 67 and 68 of cam stop 65. During this process, band tension spring housing 34 must be horizontal as seen in Figures 1, 5 and 6. The nuts on bolts 61 and 62 are then manipulated to set finger distance $X_0$ to the required distance to obtain the desired band tension, which as previously stated is dependent upon the band tension spring characteristics. Care must be taken during adjustment to see that fingers 82 and 83 are equidistant from spring housing trunnions 35. After this has been done the follower bolts 80 and 81 are set and locked to provide clearance "$f$" between the bolt points and stop cam faces, for proper functioning of the brake mechanism. So also when the brake lining is worn the cam stop clearances and the distance between the fingers will increase to reduce the braking force. This force may again be restored by adjusting the eye bolts until the proper distance between the fingers is again effected.

Although the invention has been disclosed as applying to a heavy ordnance piece it is to be understood that its use is not limited thereto, and may, for example, be used in other devices such as hoisting equipment, cranes, elevators, winches, automotive transmissions and the like where positive locking and semi-automatic and manual control are desirable.

Numerous other modifications and alterations of the structure which has been disclosed herein for purposes of illustration will be apparent to one skilled in the art and it is obvious that the same may be made without departing from the spirit and scope of the invention as defined in the following claims.

I claim:

1. A mechanical brake comprising a housing, a brake drum mounted in said housing for clockwise and counterclockwise rotation, a normally tight fitting brake band disposed about the periphery of said brake drum, said brake band having circumferentially spaced ends, a pair of axially spaced mounting plates disposed below said brake drum and secured to said housing, a first lever pivotally mounted between said mounting plates, means to pivotally secure the adjacent end of said first lever to a band end, a second similar and oppositely placed lever pivotally mounted between said mounting plates, means to pivotally secure the adjacent end of said second lever to the second band end, spring pressed means disposed between the remote ends of said levers to force said levers outwardly to thereby impress equal braking tension on each said band end and comprising a cylinder housing trunnioned in bearings formed in said mounting plates, two oppositely disposed cup-shaped pistons slidable in said housing, a helical spring biasing said pistons in opposed direction, linkage means pivotally connecting the heads of said pistons with the remote ends of said levers, and means connected to said spring pressed means actuable to bring said levers together to simultaneously relieve the tension on said brake band ends whereby said drum may be rotated.

2. In a normally set brake mechanism, a rotatable drum, a fixed frame, a band nearly encircling said drum, a pair of levers pivoted on said frame, means connecting one end of each lever with a respective end of said band, means elastically urging the other ends of said levers apart to contract said band about said drum, manually operable means swinging said levers to release said band, stop means movably mounted on said frame, abutment means on each said lever releasably engaging said stop means to prevent band-releasing movement of said levers, and means operable in unison with said manually operable means to move said stop means out of the paths of movement of said abutment means as said levers are swung to band-releasing position.

3. In a normally set brake mechanism, a rotatable drum, a fixed frame, a band nearly encircling said drum, a pair of levers pivoted on said frame each having an end operatively connected with a respective end of said band, means including a spring yieldingly urging the other ends of said levers apart to contract said band about said drum, a cam pivoted on said frame between said levers and having a pair of raised faces, abutment means on each of said levers in substantial engagement with a respective raised face on said cam when said brake band is tensioned about said drum, manual means operable to swing said other ends of said levers toward each other and simultaneously rotating said cam in clockwise direction to release said band from said drum, and means including resilient means actuable upon release of said manual means to rotate said cam counterclockwise and to swing said levers apart whereby each said raised face is moved into the path of its abutment means and band tension is restored.

4. A mechanical brake of the external expanding and contracting type comprising, a brake drum, a normally tight brake band disposed about the periphery of said brake drum and having circumferentially spaced ends, first means including a spring fixed to said band ends for placing each of said ends under equal tension to normally lock said drum against rotation, second means cooperating with said first means to alternately increase the braking force at each band end upon torque reversal, and third means connected to said first and second means manually operable to simultaneously release said tension at each band and whereby said drum may be rotated.

5. A mechanical brake for reversible torque comprising a housing, a brake drum mounted for clockwise and counter-clockwise rotation in said housing, a brake band disposed about the periphery of said brake drum, said brake band having circumferentially spaced ends, a pair of levers each having one end operatively connected to a respective band end, said levers being pivotally mounted in said housing for rotation in opposed directions, means normally resiliently pressing said levers apart to impress an equal tensile braking force on each band end, a cam having a pair of raised faces and mounted in said housing between said levers and below said brake drum, a pair of arms integral with said levers and extending downwardly and inwardly toward said cam, and means mounted on each arm to alternately engage a respective raised face on said cam at each torque reversal to increase the braking force at each corresponding band end.

6. In a normally set brake mechanism, a fixed frame, a drum rotatably mounted in said frame, a band nearly encircling said drum, a pair of levers pivoted on said frame, means connecting one end of each lever with a respective band end, a cam rotatably mounted on said frame between said levers, a pair of raised faces formed on said cam, abutment means on each said lever substantially engaging a respective raised face on said cam when said drum is locked against rotation, means forming a housing having opposed ends each pivotally engaging a respective other end of said lever, elastic means in said housing normally urging said other ends apart to apply equal tension to each said band end, means manually operable to rotate said housing to swing said other ends of said levers toward each other, and means connecting said housing to said cam for rotating said cam in unison with said housing whereby tension on said band is released.

7. The combination in claim 6 wherein said housing comprises a cylinder trunnioned in bearings formed in said frame, two oppositely disposed cup-shaped pistons slidable in said cylinder, said piston being biased apart by a helical spring forming said elastic means, and linkage means pivotally connecting the heads of said pistons with the other ends of said levers.

8. The combination in claim 7 wherein said means to connect said housing with said cam comprises a first upwardly extending arm having one end secured to said cylinder, a second downwardly extending arm having one end secured to said cam, and a link having its opposed ends pivotally connected to the free ends of said first and second arms.

9. The combination in claim 8 wherein said manually operable means comprises a downwardly extending J-shaped lever having one end secured to the lower surface of said cylinder, there being a pair of apertures formed in the other end of said J-shaped lever, a first rod pivotally received in one of said apertures to rotate said housing to brake releasing position, a second rod pivotally mounted in said other aperture having resilient means secured thereto and biased to return said housing to brake locking position when said first rod is released.

10. The combination in claim 9 wherein said means connecting said levers to said band ends comprises a plate secured to each said band end, a pair of circumferentially spaced upstanding bosses on each plate, each pair of bosses having alined bores for receiving an adjusting eye bolt, each said lever being pivotally received in the eye of a respective eye bolt.

11. The combination in claim 10 including fingers integral with and depending from the lower ends of said levers, each said eye bolt being screw-threadedly adjustable to achieve a predetermined band tension in accordance with known characteristics of said helical spring and a predetermined distance between said fingers.

References Cited in the file of this patent

UNITED STATES PATENTS

| Number | Name | Date |
|---|---|---|
| 1,125,759 | Steen | Jan. 19, 1915 |
| 1,547,355 | Bayer et al. | July 28, 1925 |
| 1,595,762 | Dumble | Aug. 10, 1926 |
| 1,847,867 | Dodge | Mar. 1, 1932 |
| 2,275,142 | Hale | Mar. 3, 1942 |